(12) United States Patent
Ueda

(10) Patent No.: US 6,236,031 B1
(45) Date of Patent: May 22, 2001

(54) OPTICAL HEAD, RECORDING AND/OR REPRODUCING APPARATUS, AND OPTICAL DISC DRIVE WITH AN AUXILIARY FOCUS SERVO SYSTEM

(75) Inventor: Mitsunori Ueda, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/385,137

(22) Filed: Aug. 30, 1999

(30) Foreign Application Priority Data

Sep. 4, 1998 (JP) .................................................. 10-251331
Feb. 17, 1999 (JP) .................................................. 11-039208

(51) Int. Cl.$^7$ ..................................................... G02B 7/04
(52) U.S. Cl. ..................................... 250/201.5; 250/201.2
(58) Field of Search .............................. 250/201.5, 201.2, 250/559.29; 369/44.14, 44.26, 44.29, 44.11

(56) References Cited

U.S. PATENT DOCUMENTS 5,715,218 * 2/1998 Ikeda .................................. 369/44.29

* cited by examiner

Primary Examiner—Que T. Le
(74) Attorney, Agent, or Firm—Ronald P. Kananen; Rader, Fishman & Grauer

(57) ABSTRACT

In an optical head including an optical unit consisting of a light source and photosensor, and a main focus servo means to allow an objective lens to focus a light beam emitted from the light source, and further an auxiliary focus servo means provided between the optical unit and objective lens to detect a position of the objective lens, the objective lens staying outside a range in which the main focus servo means provides a significant signal output, is moved into that range based on a detection signal from the auxiliary focus servo means.

29 Claims, 13 Drawing Sheets

OPTICAL HEAD, RECORDING AND/OR REPRODUCING APPARATUS, AND OPTICAL DISC DRIVE WITH AN AUXILIARY FOCUS SERVO SYSTEM

BACKGROUND OF THE INVENTION

1. Field of the Invention

The present invention relates to an optical head to write and read information to and from a recording medium such as an optical disc and a recording and/or reproducing apparatus provided with such an optical head.

2. Description of the Related Art

For focus servo-control of an optical head in relation to an optical disc, an objective lens is moved along the optical axis thereof towards and away from the optical disc, a laser light is irradiated through the objective lens, and a change of the laser light is returned to a focus servo signal detecting photosensor, thereby estimating whether the objective lens is in an in-focus relation to the optical disc.

When the light beam through the objective lens is nearly just focused on the optical disc, a servo mechanism is activated for an operation called "focus pull-in".

Normally the focus pull-in is within a range from dozens of $\mu$m to several $\mu$m from a position of the objective lens when a laser light through the objective lens is focused on a signal recording surface of the optical disc. When the distance between the objective lens and the signal recording surface of the optical disc is outside the above range, it is difficult to accurately estimate the distance between the signal recording surface of the optical disc and the objective lens and thus the focus pull-in cannot rapidly be done.

To avoid the above, it is necessary to first determine a range in which the objective lens is to be moved. The range should cover an axial deflection of the optical disc, deviation of the objective lens from a mechanical reference height, deviation of objective lens focal distance, and so forth.

The focus servo signal is detected by the astigmatic method, Foucault's method, critical angle method, or an SSD (spot size detection) method in which it is detected based on the size of light spot, and so forth whether the light beam through the objective lens is focused on the signal recording surface of the optical disc.

The focus servo pull-in range (to assure a significant signal output) can be widened with a consideration given to the optical design including optical part locations and sizes, photosensor specifications, and so forth.

However, any of the above focus servo methods can hardly allow to widen the pull-in range to more than dozens of gm in view of the servo signal gain.

Therefore, if the focus servo deviates greatly during an initial focus pull-in or due to a disturbance, the objective lens has to be moved in a wide range, to thereby detect a focus servo signal until the objective lens enters the focus servo pull-in range.

For example, if the optical disc deflects ±0.3 mm axially thereof, the objective lens has to be moved 0.6 mm or more.

For example, in an optical system in which the focus servo pull-in range is 10 $\mu$m and the objective lens is moved over a distance WD of less than 0.6 mm, if small dust or scratch has caused the focus error signal output to be unstable and the objective lens follows up with the stable output and moves to outside the focus servo pull-in range, the objective lens will possibly collide with the optical disc at worst.

Also, if the objective lens has a large numerical aperture NA while the laser light is not changed in diameter correspondingly, the moving distance W)D of the objective lens will be short. For no collision of the objective lens with an optical disc, the optical disc should have an improved flatness, which however is very difficult to attain.

If a measuring system is available which can determine a geometric relation between the objective lens and optical disc even when the objective lens is moved only several $\mu$m due to a disturbance, it is possible to provide a mechanism which prevents, based on an output signal from the measuring system, a collision of the objective lens with the optical disc. The measuring system can be used as an auxiliary focus pull-in means.

It has been proposed to use a reflective photosensor or capacitance sensor, for example, as the auxiliary focus pull-in means in order to control the position of the objective lens. However, the measuring system was problematic in that the reliability on its controlling ability is low and its size is too large.

Also it has been proposed by the Applicant of the present invention (as in the U.S. patent application Ser. No. 09/172, 621 (filed on Oct. 15, 1998) to install on an actuator of the objective lens an optical system to detect a distance to an optical disc and use it for an aid to the focus pull-in operation. In this case, however, since more than one optical system is provided, a complete coordination cannot be established between them and the optical systems.

Further, in case such an auxiliary optical system is provided in the same optical path, the latter should be divided, which however will cause the amount of return light coming, by reflection, from a signal recording surface of an optical disc to the optical head to be smaller and thus the S/N ratio to be deteriorated. Also the optical path is complicated so that the optical system is large, which will limit the optical head from being designed more compactly and lead to an extra cost for the auxiliary optical system.

On the assumption that the auxiliary focus pull-in means provides a servo control signal similarly to the aforementioned normal focus servo means, if the range of servo pull-in by the auxiliary means is 0.3 mm or more, it can be considered that no collision of the objective lens with an optical disc will exist.

Since the auxiliary focus pull-in means is a protective servo against a large disturbance, it may be called "gap servo".

It may be considered that positive use of this auxiliary means contributes to speed-up of focus pull-in.

SUMMARY OF THE INVENTION

Accordingly, the present invention has an object to overcome the above-mentioned drawbacks of the prior art by providing a compact optical head including an auxiliary focus pull-in means designed to be simple and compact and in which an objective lens existing even outside a range in which a significant focus servo signal output can be provided can be prevented from colliding with an optical disc, and a recording and/or reproducing apparatus provided with the optical head.

The above object can be attained by providing an optical head including an optical unit consisting of a light source and photosensor, and a main focus servo means to allow an objective lens to focus a light beam emitted from the light source, the optical head comprising according to the present invention:

an auxiliary focus servo means provided between the optical unit and objective lens to detect a position of the objective lens;

the objective lens staying outside a range in which the main focus servo means provides a significant signal output, being moved into that range based on a detection signal from the auxiliary focus servo means.

In the above-mentioned optical head, the objective lens staying outside a range in which because of a disturbance or the like, the main focus servo means provides a significant signal output, is moved into the range based on the significant signal output from the main focus servo means, so that the objective lens can be returned to that range safely without any collision thereof with an optical disc.

Since the auxiliary focus servo means is disposed between the optical unit and the objective lens, the auxiliary focus servo means can be designed to be simple and compact.

Also the above object can be attained by providing a recording and/or reproducing apparatus including an optical head to write and read information to and from a recording medium, the optical head comprising according to the present invention:

an optical unit consisting of a light source and photosensor;

a main focus servo means to allow an objective lens to focus a light beam emitted from the light source, and an auxiliary focus servo means provided between the optical unit and objective lens to detect a position of the objective lens;

the objective lens staying outside a range in which the main focus servo means provides a significant signal output, being moved into that range based on a detection signal from the auxiliary focus servo means.

Further the above object can be attained by providing an optical disc drive including an optical unit consisting of a light source and photosensor, and a focus servo means to allow an objective lens to focus a light beam emitted from the light source towards an optical disc, the focus servo means comprising according to the present invention:

a first focus servo means for detecting a position of the objective lens staying in a first range in which a light beam irradiated towards the optical disc is nearly just focused on the optical disc; and a second focus servo means for detecting a position of the objective lens moved into a second range outside the first range and in which the first focus servo means provides a significant signal output.

These objects and other objects, features and advantages of the present intention will become more apparent from the following detailed description of the preferred embodiments of the present invention when taken in conjunction with the accompanying drawings.

BRIEF DESCRIPTION OF THE DRAWINGS

FIG. 5 shows a focus error signal detected in the critical angle method, of which FIG. 5A shows a focus error signal when no dead zone exists while

DETAILED DESCRIPTION OF THE PREFERRED EMBODIMENTS

Prior to proceeding to a detailed description of the embodiments of an optical head according to the present invention, the focus servo by the critical angle method will be described below:

When a light travels from a high refraction medium $n_1$ to a low refraction medium $n_2$ ($n_1 > n_2$), it will be refracted at a certain angle according to the Snell's law. On the assumption that the angle of incidence from the high refraction medium to low refraction medium is $\theta_1$, the angle of refraction $\theta_2$ will be:

$$\theta_2 = \text{Arc sin} (n_1 \times \sin(\theta_1)/n_2)$$

Therefore, when $\sin(\theta_1) > n_2/n_1$, $\theta_2$ is an imaginary number, which means that the light is not refracted but totally reflected.

The focus servo by the critical angle method uses a critical angle prism 4, for example, as shown in FIG. 2.

The critical angle prism 4 is made of a material having a relatively high refractivity and shaped to have a triangular section. As shown, a surface 4a of the critical angle prism 4 corresponding to the hypotenuse of the triangle is a reflective surface.

An angle (incident angle) defined between the optical axis of an incident light upon the critical angle prism 4 and the reflective surface 4a of the prism 4 is a critical angle $\theta_c$ of a total internal reflection at the boundary between a material of the critical angle prism 4 and air, that is, a critical angle satisfying $\sin(\theta_c) = n_2/n_1$.

Further, a photosensor 10 consisting of two split photodiodes $PD_1$ and $PD_2$ is disposed downstream of the critical angle prism 4.

Moreover, the optical system is adjusted for the return light coming, by reflection, from the signal recording surface of an optical disc and having passed through an objective lens 5 to be parallel to the optical axis when the objective lens 5 is positioned in an in-focus relation (as indicated with a reference J in FIG. 2) to the signal recording surface of the optical disc.

Owing to the above optical system configuration, a return light coming, by reflection, from the signal recording surface of the optical disc and having passed through the objective lens is reflected at the reflective surface 4a of the critical angle prism 4 and detected by the photosensor 10.

Figure 2A:
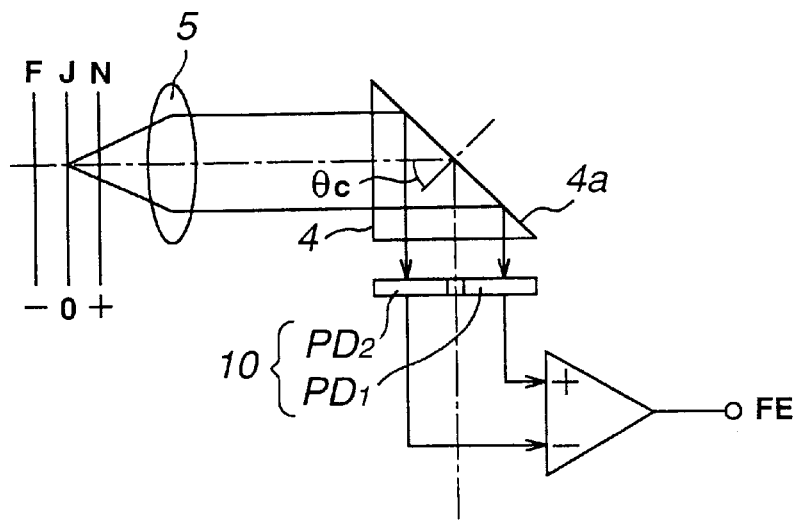
FIG. 2, consisting of FIGS. 2A through 2C, explains the focus servo by the critical angle method.

Next, how a focus servo signal is detected in the optical head constructed as mentioned above will be described below with reference to FIG. 2 (FIGS. 2A to 2C):

First, when the objective lens 4 is positioned in an in-focus relation (as indicated with a reference J) to the signal recording surface of the optical disc as shown in FIG. 2A, a return light coming, by reflection, from the signal recording surface of the optical disc is passed through the objective lens 5 to be a parallel light which will be incident upon the critical angle prism 4.

Since the return light is incident upon the reflective surface 4a of the critical angle prism 4 at an angle equal to the critical angle $\theta_c$ of total internal reflection, the return light is totally reflected at the reflective surface 4a and incident upon the photosensor 10. At this time, the received amount of light is $PD_1 = PD_2$, so that a focus error signal $FE = PD_1 - PD_2 = 0$.

Figure 2B:
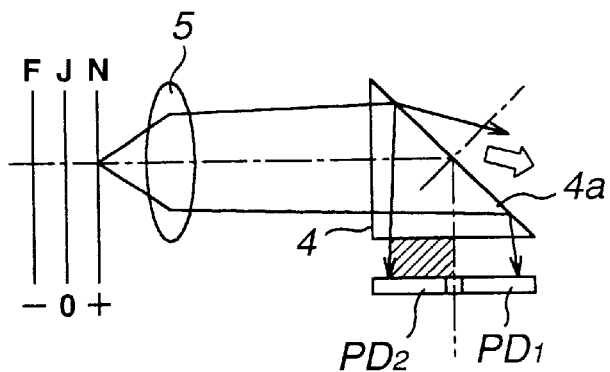

As seen from FIG. 2B, if the objective lens 5 is too near the signal recording surface of the optical disc (as indicated with a reference N in FIG. 2), the return light having passed through the objective lens 5 will be divergent.

At this time, the return light above the optical axis is incident upon the reflective surface 4a of the critical angle prism 4 at an angle smaller than the critical angle $\theta_c$ and thus it will partially be passed through the reflective surface 4a. Since the light under the optical axis is incident at an angle larger than the critical angle $\theta_c$, so it will be totally reflected at the reflective surface 4a.

Thus, the totally reflected light is incident upon the right photodiode $PD_1$ of the photosensor 10. However, it is partially passed through the reflective surface 4a while the remainder is incident upon the left photosensor $PD_2$, so that the received amount of light is reduced.

Therefore, the received amount of light is $PD_1 > PD_2$, so that the focus error signal $FE = PD_1 - PD_2 > 0$.

Figure 2C:
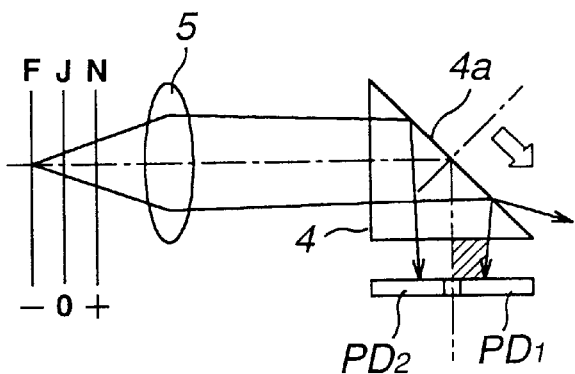

As seen from FIG. 2C, if the objective lens 5 is too far from the signal recording surface of the optical disc (as indicated with a reference F in FIG. 2), the return light having passed through the objective lens 5 will be convergent.

At this time, the return light above the optical axis is incident upon the reflective surface 4a of the critical angle prism 4 at an angle larger than the critical angle $\theta_c$ and thus it will totally be reflected at the reflective surface 4a. Since the light under the optical axis is incident at an angle smaller than the critical angle $\theta_c$, so it will partially be passed through the reflective surface 4a.

Thus, the totally reflected light is incident upon the left photodiode $PD_2$ of the photosensor 10. However, it is partially passed through the reflective surface 4a while the remainder is incident upon the right photosensor $PD_1$, so that the received amount of light is reduced.

Therefore, the received amount of light is $PD_1 < PD_2$, so that the focus error signal $FE = PD_1 - PD_2 < 0$.

Thus, focus error signals FE with difference signs are thus produced correspondingly to directions in which the focusing of the light by the objective lens 5 is off the in-focus position J on the signal recording surface of an optical disc. The objective lens 5 can be moved based on the focus error signal FE to focus the light beam precisely on the signal recording surface.

Figure 3:
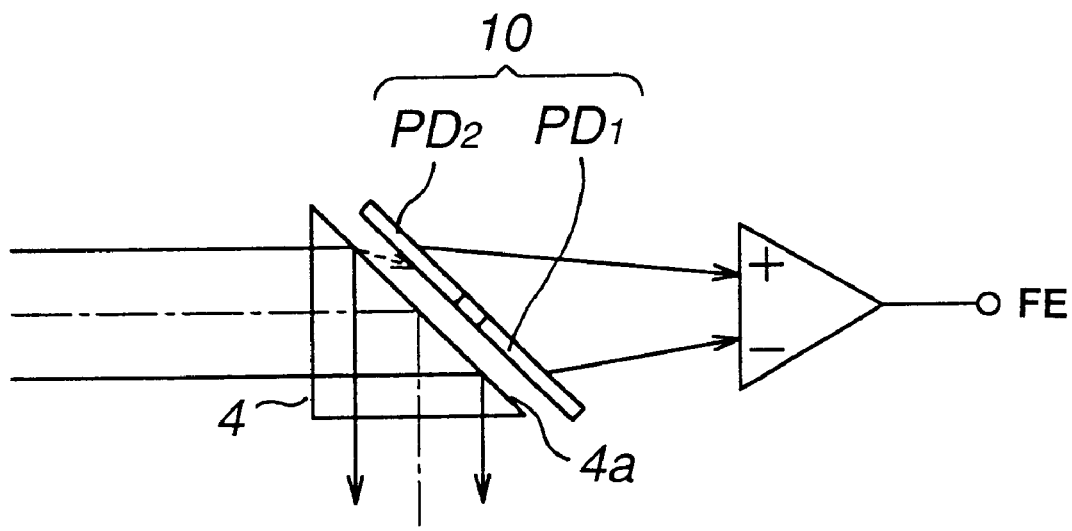
FIG. 3 shows a photosensor provided opposite the reflective surface of a critical angle prism.

The focus servo by the critical angle method includes ones shown in FIGS. 2 and 3, respectively.

In the critical angle method shown in FIG. 2, a light reflected at the reflective surface 4a of the critical angle prism 4 is detected by the photosensor 10 consisting of the two split photodiodes $PD_1$ and $PD_2$, as having been described in the above.

This method is widely used because of its advantages in that a return light is incident upon the photosensor 10 in a large amount and nearly perpendicularly to the latter.

On the other hand, in the method shown in FIG. 3, the photosensor 10 consisting of the two split photodiodes $PD_1$ and $PD_2$ receives a light having passed through the reflective surface 4a of the critical angle prism 4 and thus refracted.

In this method, if a return light having passed through the objective lens 5 is divergent, it will not be incident upon the lower photodiode $PD_1$ of the photosensor 10 while only the upper photodiode $PD_2$ receives a light having passed through the reflective surface 4a of the critical angle prism 4. Therefore, the received amount of light is $PD_1 < PD_2$ so that the focus error signal $FE = PD_1 - PD_2 < 0$.

On the other hand, if the return light having passed through the objective lens 5 is a convergent light, a light having passed through the reflective surface 4a of the critical angle prism 4 is incident upon only the lower photodiode $PD_1$ while no light will be incident upon the upper photodiode $PD_2$. Therefore, the received amount of light is $PD_1 > PD_2$ so that the focus error signal $FE = PD_1 - PD_2 > 0$.

It should be noted that if the photosensor 10 and critical angle prism 4 are attached to each other, their difference in refractivity may possibly disable the total internal reflection. To avoid this for the method shown in FIG. 3, it is necessary to provide an air layer (gap) between them or prepare the critical angle prism 4 whose refractivity is sufficiently high for enabling the total internal reflection even if the photosensor 10 and critical angle prism 4 are attached to each other.

Further, of the light having passed through the reflective surface 4a of the critical angle prism 4 because the total internal reflection is disabled, a one going out of the reflective surface 4a in parallel to the latter can hardly be received by the photosensor 10, resulting a wider dead zone.

In the method shown in FIG. 3, however, since the light subjected to a total internal reflection when the objective lens 5 is positioned in an in-focus relation to the signal recording surface of the optical disc will not be split for reception by the photosensor 10, the light can advantageously be utilized freely in the downstream optical system.

Therefore, the method shown in FIG. 3 should preferably be adopted in the present invention to provide an auxiliary focus servo means which will further be described later.

Figure 1:
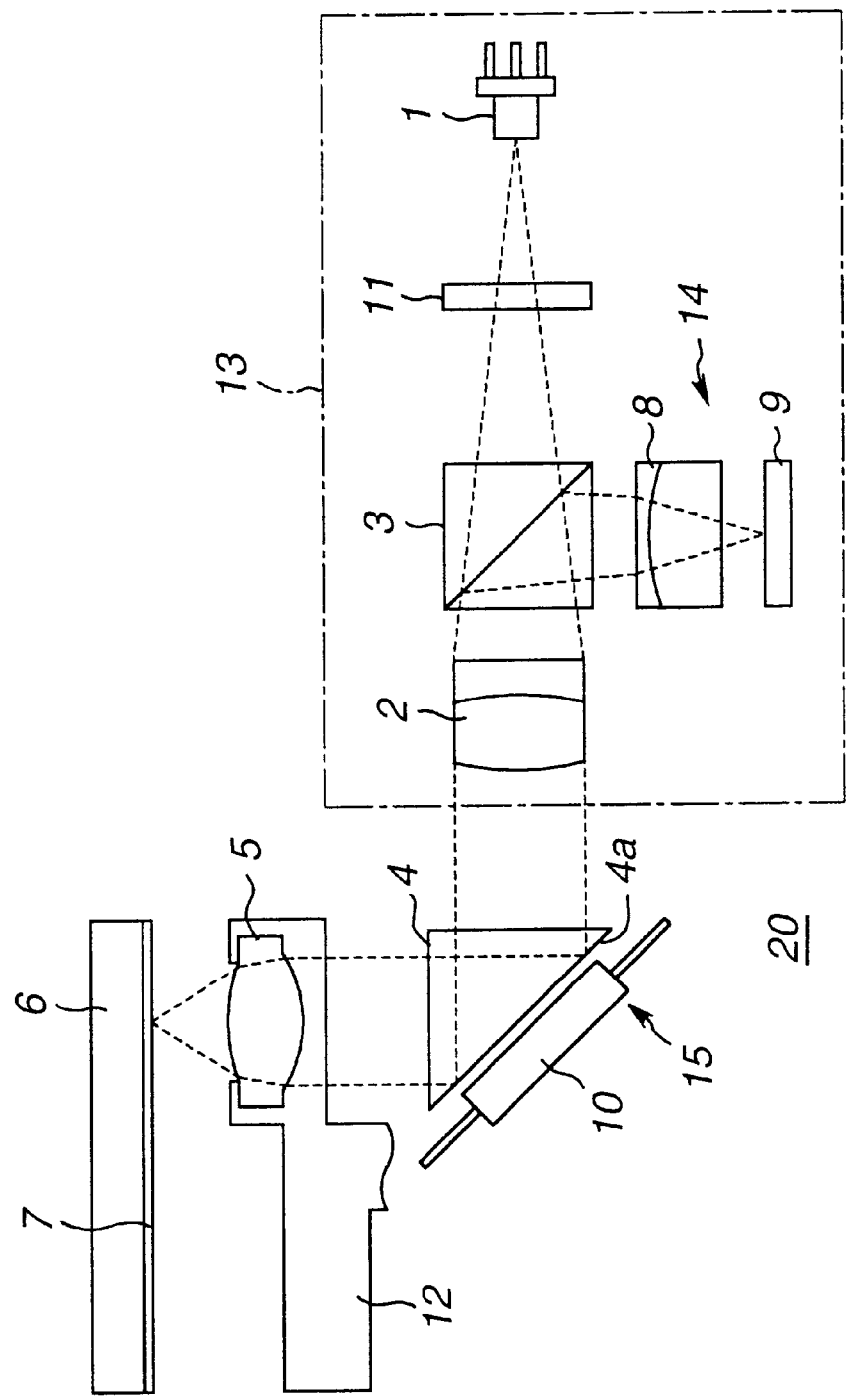
FIG. 1 schematically illustrates the construction of one embodiment of an optical head according to the present invention.

Next, the embodiments of optical head according to the present invention will be described herebelow:

Referring now to FIG. 1, there is schematically illustrated the construction of the first embodiment of optical head according to the present invention. The optical head is generally indicated with a reference 20.

The optical head 20 comprises a semiconductor laser 1 to emit a laser light, a collimator lens 2 to form the laser light into a parallel one, a beam splitter (will be referred to as "BS" hereinafter) 3 to split a return light coming, by reflection, from a signal recording surface 7 of an optical disc 6, a critical angle prism 4, an objective lens 5 to focus the laser light from the laser 1 on the signal recording surface 7 of the optical disc 6, multi-lens (a composite lens consisting of a spherical lens and cylindrical lens) 8, a photodiode 9 to detect or receive light, a photodiode 10 (photosensor) to detect a light having passed through the reflective surface of the critical angle prism 4, a grating 11 to adjust the outgoing light beam, and a biaxial actuator 12 to drive the objective lens 5.

Of the above-mentioned components of the optical head 20, the semiconductor laser 1, photodiode 9, collimator lens 2, BS 3, multi-lens 8 and grating 11 form together an optical unit 13. Further, the BS3, multi-lens 8 and photodiode 9 form together a main foes servo means 14.

The photosensor 10 consists of two split photodiodes $PD_1$ and $PD_2$ and is disposed opposite to the reflective surface 4a of the critical angle prism 4.

The critical angle prism 4 and photosensor 10 form together an auxiliary focus servo means 15.

The critical angle prism 4 is a prism in which the total internal reflection of light is utilized. It is made of glass or plastic, and formed to have a triangular section. The reflective surface 4a of the prism 4 is a surface corresponding to the hypotenuse of the triangular section.

The optical system is adjusted so that an angle defined between the optical axis of a return light from the signal recording surface 7 of the optical disc 6, namely, a light incident upon the reflective surface 4a of the critical angle prism 4, and the reflective surface 4a itself, coincides with the aforementioned critical angle $\theta_c$ of total internal reflection.

Thus, since the aforementioned critical angle method shown in FIG. 3 is implemented by the auxiliary focus servo means 15 composed of the critical angle prism 4 and photosensor 10, it can be used for servo control of the objective lens 5 for focusing the light beam on the signal recording surface 7 of the optical disc 6.

Since the photosensor 10 is adapted to receive or detect a light having passed through the reflective surface 4a of the critical angle prism 4 as in FIG. 3, so the light totally reflected at the reflective surface 4a when the objective lens 5 is positioned in an in-focus relation to the signal recording surface 7 of the optical disc 6, will not be split for detection by the photosensor 10, so that the return light can advantageously be utilized freely in the downstream optical system such as the optical unit 13, and so forth.

Note that as a variant of the optical head 20, the auxiliary focus servo means 15 may be adapted such that a light reflected at the reflective surface 4a is detected by the photosensor 10 as shown in FIG. 2.

In this case, however, for signal detection by the photodiode 9 in the main focus servo means 14 of the downstream optical unit 13, for example a BS or any other optical part should be provided as means for separating a light which is to be utilized in the downstream optical unit from a light detected by the photosensor 10. The amount of light usable in the downstream optical unit is smaller for the light amount detected by the photosensor 10.

Therefore, the optical head 20 should preferably be adapted for the light having passed through the reflective surface 4a to be detected by the photosensor 10 as shown in FIG. 3.

Also, in the optical head 20 constructed as shown in FIG. 1, the main focus servo is done by the astigmatic method using an astigmatism caused by the combination of a cylindrical lens and spherical lens, for example, in the multi-lens 8 while the tracking servo is done by the three-spot method in which a diffracted light is generated from an outgoing light by the grating 11.

The optical head 20 constructed as having been described in the foregoing functions as will be described herebelow:

A laser light of 650 nm in wavelength, for example, is emitted from the semiconductor laser 1 and passed through the grating 11, BS 3 and collimator 2 to provide a parallel light. The outgoing light is totally reflected by the critical angle prism 4, passed through the objective lens 5 and focused on the signal recording surface 7 of the optical disc 6.

The return light coming, by reflection, from the signal recording surface 7 goes back along the optical path along which the outgoing light from the semiconductor laser 1 has traveled, is refracted again by the objective lens 5 to provide a parallel light which will totally be reflected at the reflective surface 4a of the critical angle prism 4.

Further, the light is passed through the collimator lens 2, reflected by the BS 3 and thus split from the optical path of the outgoing light.

The light is passed through the multi-lens 8, and detected by the photodiode 9 in which the intensity of the light is converted to an electrical signal.

However, if the signal recording surface 7 displaces and thus the focused spot of the light is off the signal recording surface 7, the return light from the objective lens 5 will be a divergent or convergent light as having previously been described with reference to FIGS. 2B and 2C.

The divergent or convergent light incident upon the reflective surface 4a of the critical angle prism 4, will include a light whose incident angle is smaller than the aforementioned incident angle (critical angle $\theta_c$) enabling the total internal reflection.

A light beam not enabling the total internal reflection will pass through the reflective surface 4a, so the return light to the collimator lens 2 will be partially missing.

Figure 4A:
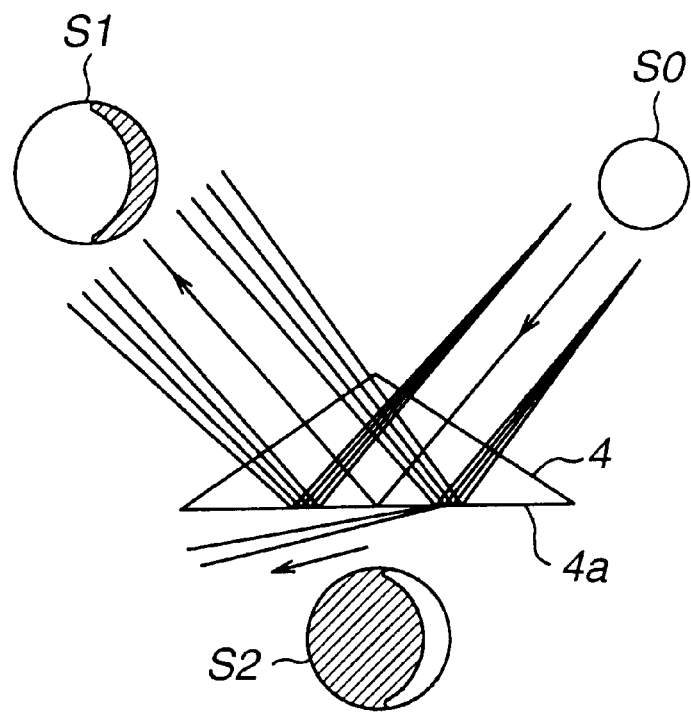
FIG. 4, consisting of FIGS. 4A through 4B, shows a spot of a return light in the optical head in FIG. 1 when light beam is not focused on an optical disc.
Figure 4B:
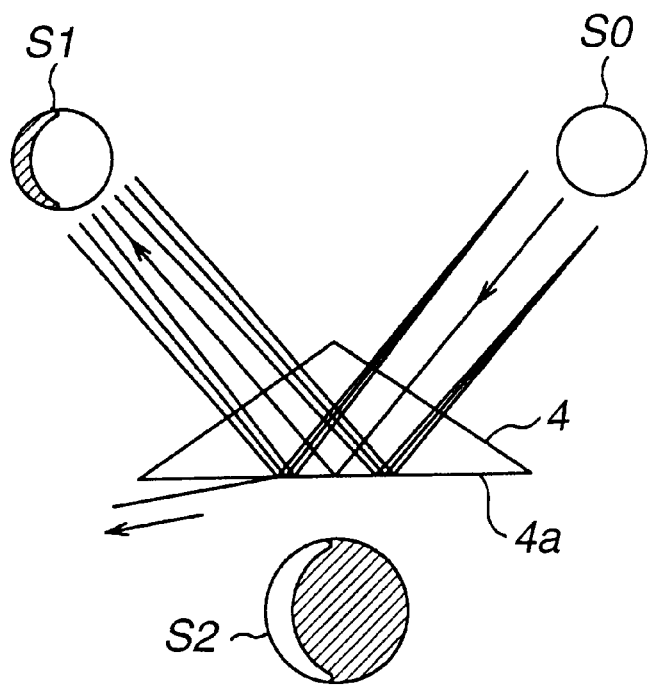

FIG. 4 shows spots of the return light when the outgoing light from the laser 1 is off the focus on the signal recording surface 7 of the optical disc 6. FIG. 4A shows return light spots on the critical angle prism 4 when the objective lens 5 is positioned to focus the outgoing light at a position short of a reference position (just focused position) on the signal recording surface 7 of the optical disc 6, and FIG. 4B shows those on the critical angle prism 4 when the objective lens 5 is positioned to focus the outgoing light at a position beyond the reference position Oust focused position) on the optical disc 6. In FIG. 4, the reference SO indicates a spot of the return light about to pass through the critical angle prism 4, S1 indicates a spot of the return light reflected at the reflective surface 4a, and S2 indicates a spot of the return light having just passed through the reflective surface 4a. The hatched portion of the spots indicates a small amount of light.

In both FIGS. 4A and 4B, the spot S1 of the return light reflected at the reflective surface 4a will be partially missing, and the spot S2 having passed through the reflective surface 4a (dark spot when the outgoing light from the laser 1 is just focused on the signal recording surface 7) will partially leak.

In FIG. 4A, the spots S 1 and S2 show changes at their respective right portions, while in FIG. 4B, the spots S1 and S2 show changes at their respective left portions.

As apparent from FIGS. 4A and 4B, detection by the photosensor 10 consisting of at least two split photodiodes $PD_1$ and $PD_2$ of a light reflected at the reflective surface 4a or a light passed through the reflective surface 4a as shown in FIG. 2 or 3, respectively, makes it possible to know whether the objective lens 5 is near or far from the signal recording surface 7 of the optical disc 6.

The focus servo system using the critical angle prism is characterized in that since a signal can be detected only when the angle of a light beam incident upon the reflective surface of the prism has changed more than a predetermined value, the detection signal will not change when the objective lens is positioned nearly in an in-focus relation to the signal recording surface of the optical disc, so that a dead zone having some width will exist.

The above is regarded as a disadvantage of the critical angle method. However, the dead zone is positively utilized in the present invention.

Figure 5A:
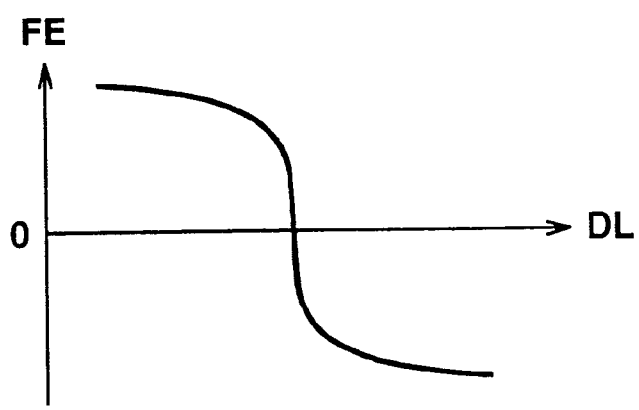
Figure 5B:
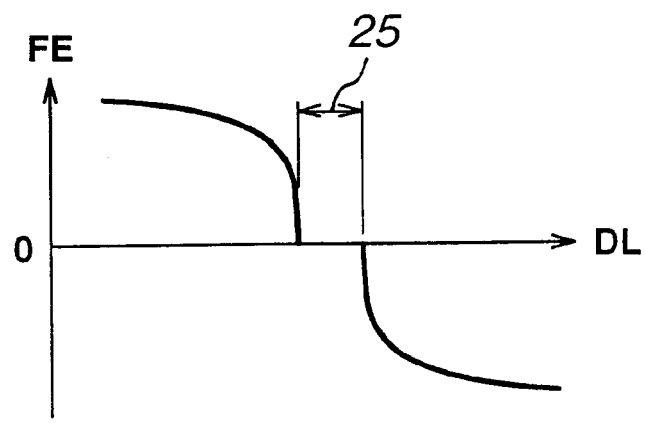
FIG. 5B shows a focus error signal when a dead zone exists.

FIG. 5 show focus error signals FE when no dead zone exists and when a dead zone exists, in comparison with each other. FIG. 5A shows a focus error signal FE when no dead zone exists, and FIG. 5B shows a focus error signal FE when a dead zone exists.

When a dead zone 25 exists in a portion of a distance DL between the objective lens and signal recording surface of an optical disc, the focus error signal FE shows a value of zero in the dead zone 25 as shown in FIG. 5B.

At this time, since the in-focus position is within the range of the dead zone 25 as mentioned above, it is difficult to accurately focus the light in place.

Figure 6A:
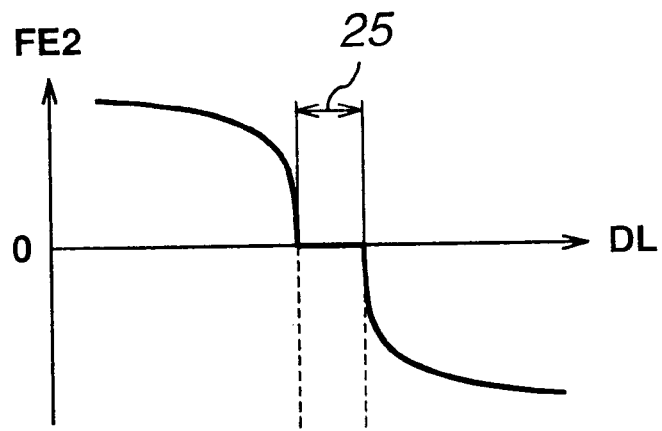
FIG. 6, consisting of FIGS. 6A through 6C, shows a relation between an auxiliary focus error signal, main focus error signal and RF signal when an auxiliary focus servo means has a dead zone.

In the critical angle method used for the auxiliary focus servo means 15 in the optical head 20 according to the present invention, when the dead zone 25 is found in an auxiliary focus error signal FE2 detected by the auxiliary focus servo means 15 as shown in FIG. 6A, the in-focus position is within the range of the dead zone 25.

Figure 6B:
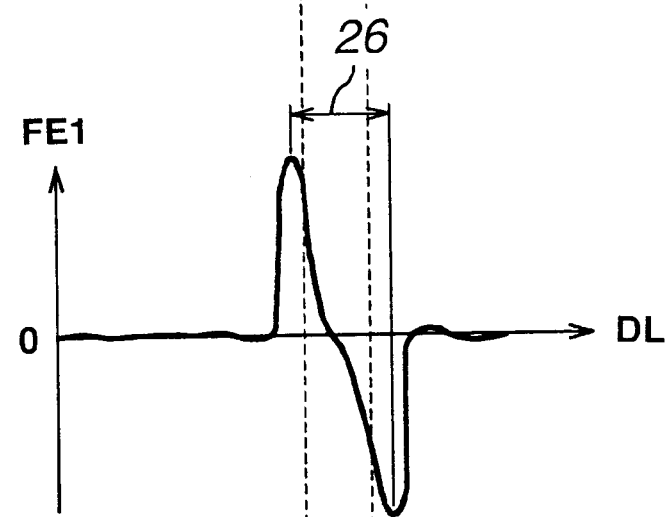

Also as shown in FIG. 6B, a main focus error signal FE1 detected by the main focus servo means 14 is a S-shaped signal having two peaks, upper and lower, when the astigmatic method is adopted, and there is between these two peaks, for example, a pull-in range 26 for the main focus servo means 14 (in which a significant signal output can be detected).

Therefore, as shown in FIGS. 6A and 6B, by setting the two focus servo means 14 and 15 so that the pull-in range 26 for the main focus error signal FE1 detected by the main focus servo means 14 is positioned in the dead zone 25 of the auxiliary focus error signal FE2 detected by the auxiliary focus servo means 15, the main focus servo means 14 can be prevented from being adversely affected by the dead zone 25.

Figure 6C:
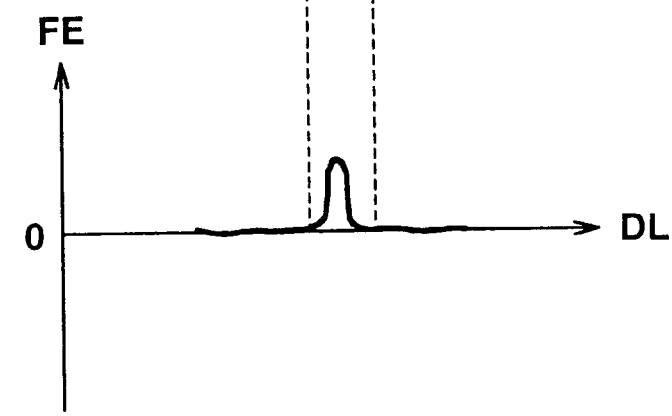

Note that an RF signal RF has a peak when the objective lens 5 focuses the light in the vicinity of the in-focus position as shown in FIG. 6C.

Figure 7:
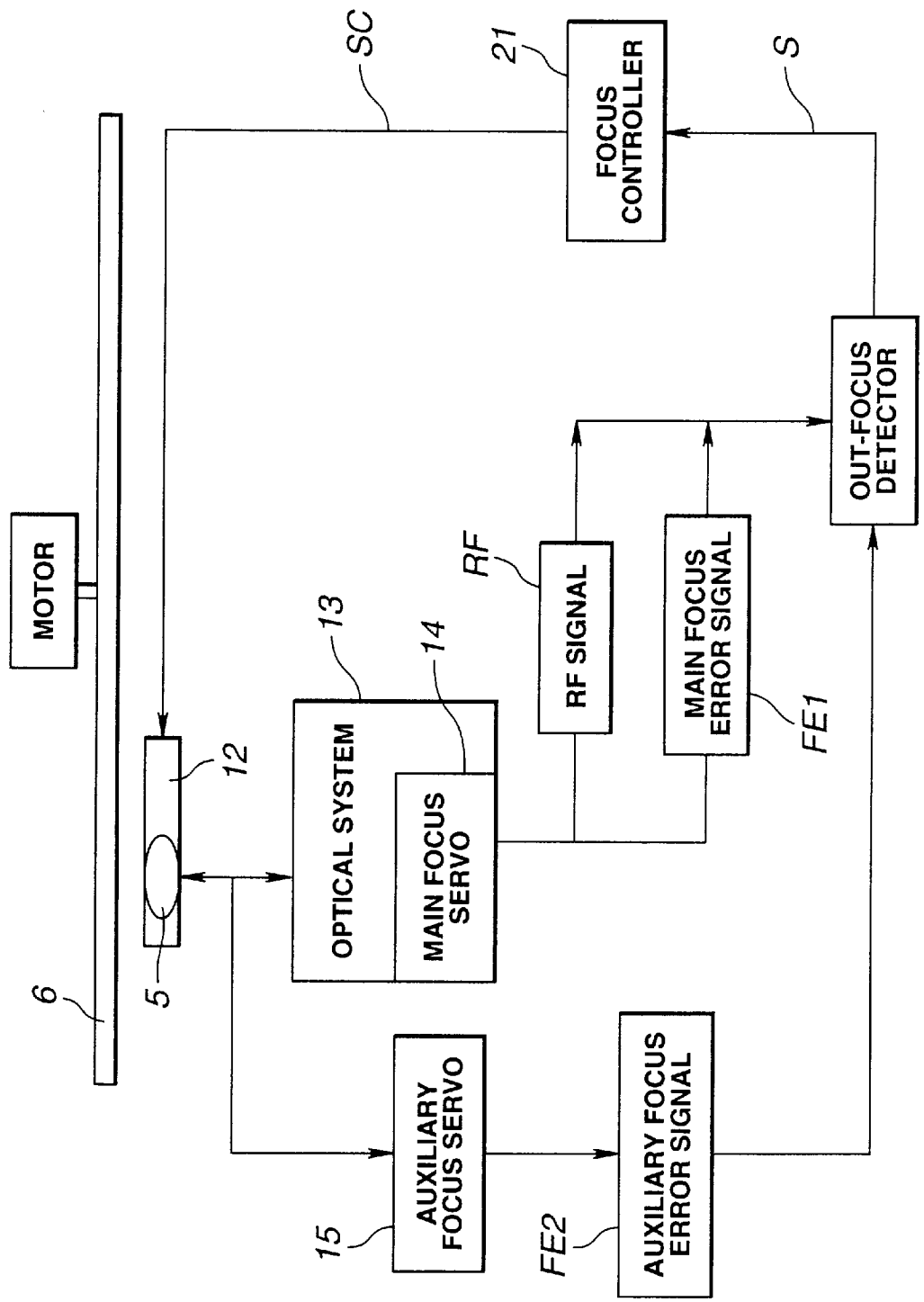
FIG. 7 shows a flow of controlling operations by the main and auxiliary focus servo means in the optical head in FIG. 1.

FIG. 7 shows a flow of controlling operations by the main and auxiliary focus servo means 14 and 15 in the optical head 20.

As shown in FIG. 7, a focus controller 21 is provided in addition to the components of the optical head 20 in FIG. 1.

The main focus servo means 14 in the optical unit 13 provides an RF signal RF and main focus error signal FE1 while the auxiliary focus servo means 15 provides the auxiliary focus error signal FE2. Defocusing is detected based on the RF signal RF and main or auxiliary focus error signal FE1 or FE2 to provide a detection signal S which will be sent to the focus controller 21.

The focus controller 21 provides a control signal SC based on the supplied detection signal S. The biaxial actuator 12 is driven based on the control signal SC to move the objective lens 5 until the light is focused in place.

In an ordinary optical head for optical disc, the focus servo control is done using a single focus servo means. For focus pull-in, the objective lens is moved in the optical-axis direction in relation to the optical disc within a wide range to detect a so-called S-shaped signal.

Further, the objective lens including the objective lens is adjusted until the zero point of the S shape is reached by the signal, and then the objective lens is further moved delicately.

On the other hand, in the optical head 20 according to the present invention, the actual focused position exists in the dead zone 25 for the auxiliary focus servo means 15, namely, in a range in which the signal output is zero. Therefore, the objective lens 5 is first moved in the optical-axis direction to check for any auxiliary focus error signal FE2 detected by the auxiliary focus servo means 15, and the objective lens 5 is further moved until it enters the dead zone 25 of the signal output.

Once the objective lens 5 enters the dead zone 25, it is moved in the optical-axis direction within a range in which it will not depart from the dead zone 25, and the main focus servo means 14 is used for normal focus pull-in.

Therefore, the width of the dead zone 25 for the auxiliary focus servo means 15 can be made smaller than the S-shaped pull-in range for the main focus servo means 14 to momentarily effect a focus pull-in by shifting from the auxiliary focus servo means 15 to the main focus servo means 14.

In this optical head 20 according to the present invention, the position of the objective lens 5 can be detected by the auxiliary focus servo means 15. Therefore, even if a disturbance has caused the position of the objective lens 5 in relation to the optical disc 6 to be out of the pull-in range for the main focus servo means 14, the objective lens 5 can quickly be returned to the in-focus position and thus prevented from colliding with the optical disc 6.

Also, at start-up of the system, focus pull-in can be effected in a reduced time.

The auxiliary focus servo means 15 is disposed between the objective lens 5 and the optical unit 13 including the light emitter and photosensor and also incorporated in the optical system of the optical head 20. Therefore, the optical head 20 can be designed more simply than in a case that an auxiliary focus servo means is provided separately.

In case the dead zone 25 of the detection signal from the auxiliary focus servo means 15 is made narrower than the S-shaped pull-in range 26 for the main focus servo means 14, shift is made from the auxiliary focus servo means 15 to the main focus servo drive 14 after move into the dead zone 25 for the auxiliary focus servo means 15, whereby accurate focusing can always be attained and focus pull-in can be done in a further reduced time irrespectively of the geometric relation of the objective lens 5 to the optical disc 6.

In FIG. 1, the signal recording surface 7 is illustrated as being formed on the front side (on the side of the objective lens) of the optical disc 6. However, it should be noted that the optical head according to the present invention is usable with an optical disc 6 having a signal recording surface 7 formed near the rear side thereof as in a compact disc for example. The optical head according to the present invention is usable with any optical disc 6 independently of the location of the signal recording surface 7 in the optical disc 6.

The main focus servo and tracking servo methods used in the present invention are not limited to the aforementioned astigmatic method and three-spot method and any other suitable method may be adopted by modifing the construction of the optical unit 13. Also, the critical angle method is adopted for the auxiliary focus servo detection. However, any of the astigmatic method, Foucault's method, critical angle method, SSD (spot size detection) method, and so forth may be used instead.

Figure 8:
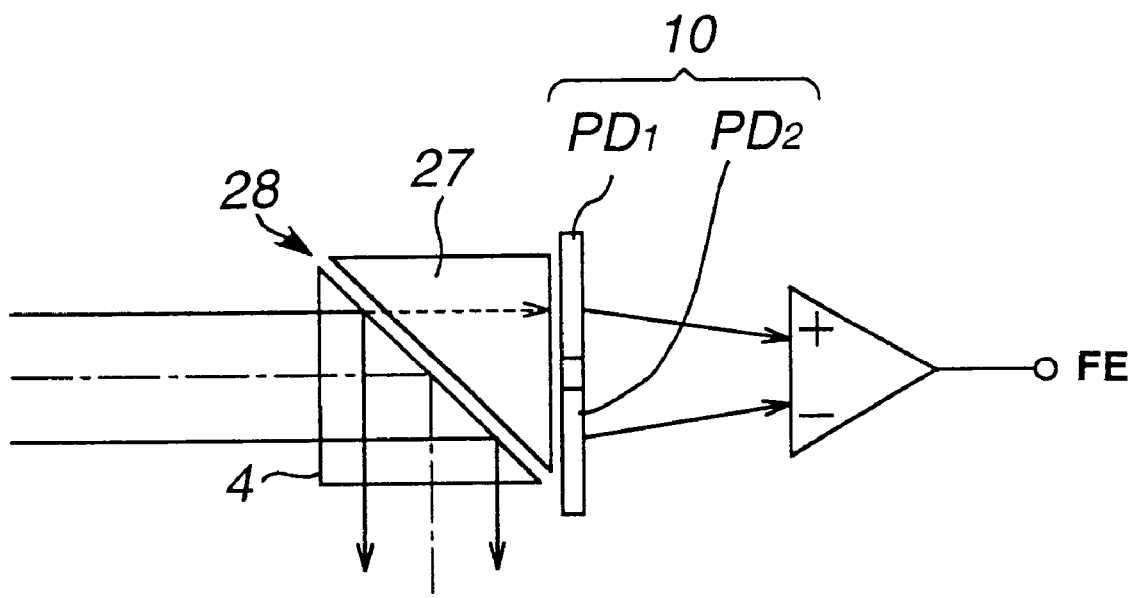
FIG. 8 shows a coupling prism disposed between the critical angle prism and photosensor.

The auxiliary focus servo means may be composed of a second prism 27 as a coupling prism disposed between the critical angle prism 4 and photosensor 10 as shown in FIG. 8.

The second prism 27 thus provided permits the light to be incident upon the photosensor 10 nearly perpendicularly as indicated with a dashed line.

Further, an air gap 28 is provided between the critical angle prism 4 and second prism 27 to keep unchanged the critical angle of total internal reflection at the reflective angle (oblique surface) 4a of the critical angle prism 4.

The auxiliary focus servo means thus constructed improves the efficiency of detection by the photosensor 10 of a light having passed through the reflective surface 4a of the critical angle prism 4.

Figure 9:
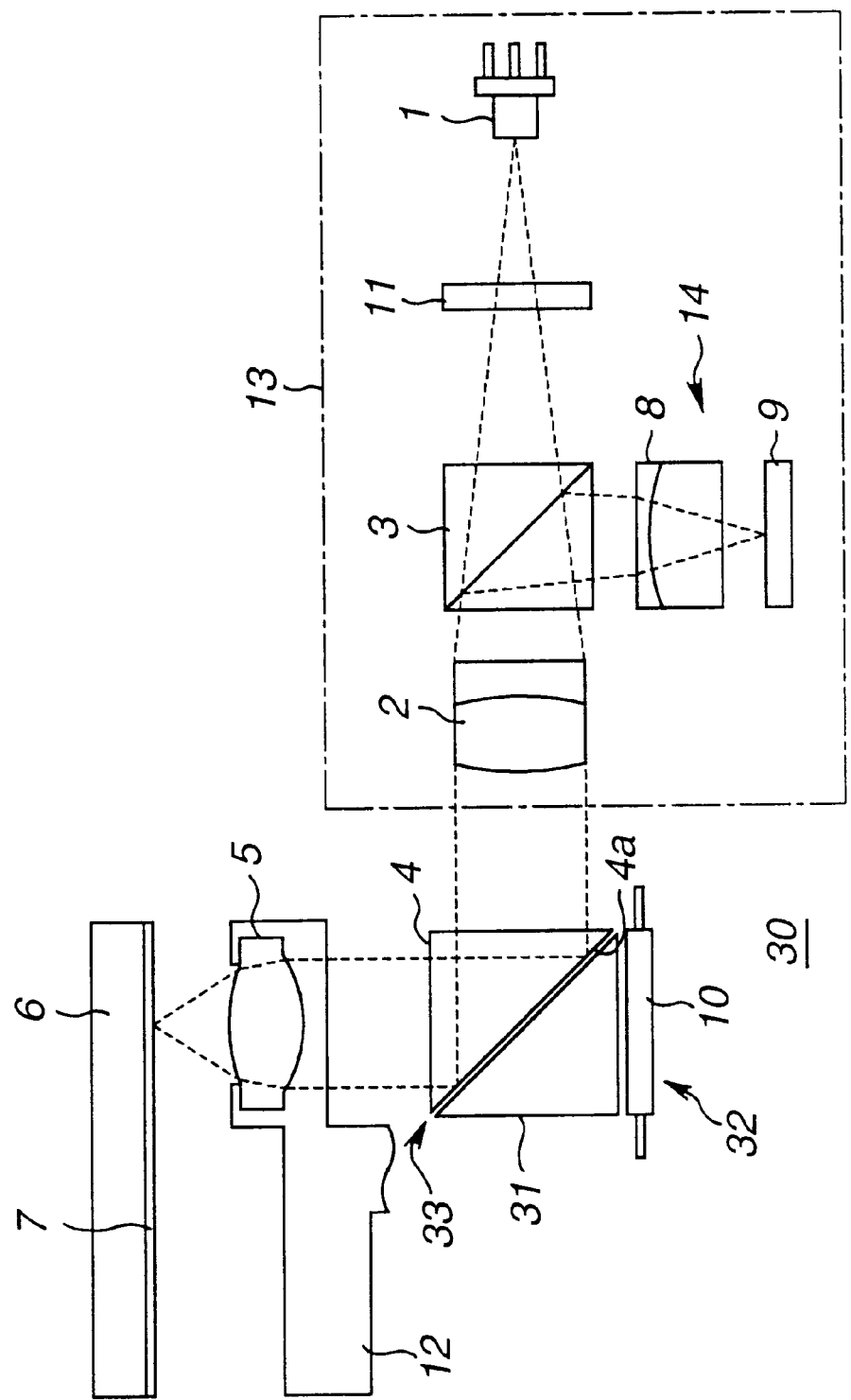
FIG. 9 schematically illustrates the construction of a second embodiment of optical head according to the present invention.

Referring now to FIG. 9, there is schematically illustrated the second embodiment of optical head according to the present invention, in which the auxiliary focus servo means shown in FIG. 8 is included. The second embodiment of optical head according to the present invention is generally indicated with a reference 30.

The optical head 30 comprises a coupling prism 31 provided between the critical angle prism 4 and photosensor 10 in addition to the components of the auxiliary focus servo means 15 in the first embodiment having been described in the foregoing. The auxiliary focus servo means thus constructed is indicated with a reference 32.

The coupling prism 31 is formed to have a triangular section. It is disposed with an oblique surface 31a thereof (best seen in FIG. 11) corresponding to the hypotenuse of the triangle being placed opposite to the reflective surface 4a of the critical angle prism 4. It should be noted that the coupling prism 31 may not always be made from the same material as that of the critical angle prism 4 and formed to have an isosceles- triangular section.

The auxiliary focus servo means 32 is provided to allow the light having passed through the reflective surface 4a of the critical angle prism 4 to be incident upon the coupling prism 31 and passed through the coupling prism 31 for detection by the photosensor 10.

As having previously been described, of the light having passed through the reflective surface 4a because the total internal reflection is disabled, a one outgoing from the reflective surface 4a in general parallel to the latter can hardly be detected by the photosensor 10.

Figure 10:
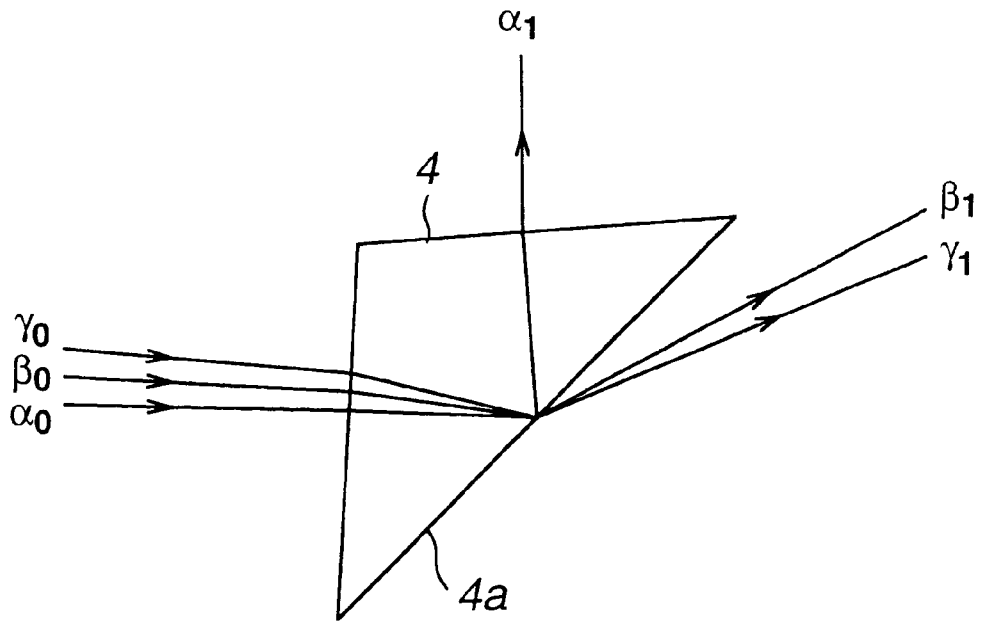
FIG. 10 shows an optical path along which a return light coming, by reflection, from a signal recording surface of an optical disc and having passed through the objective lens, is split at the reflective surface of the critical angle prism.

For example, if the return light having passed through the objective lens 5 is a one $\alpha_0$ parallel to the optical axis as shown in FIG. 10, it will totally be reflected as a light $\alpha_1$ at the reflective surface 4a when being incident upon the critical angle prism 4. On the other hand, if the return light having passed through the objective lens 5 is a one $\beta_0$ or $\gamma_0$ not parallel to the optical axis line a divergent or convergent light, when it is incident upon the critical angle prism 4, it will partially pass through the reflective surface 4a and be refracted as a light $\beta_1$ or $\gamma_1$ at an angle corresponding to the inclination in relation to the optical axis. The light $\beta_1$ or $\gamma_1$ is refracted in a direction towards the reflective surface 4a. Thus, the light $\beta_1$ or $\gamma_1$ is nearly parallel to the reflective surface 4a and can hardly be detected by the photosensor 10 with a high efficiency.

Figure 11:
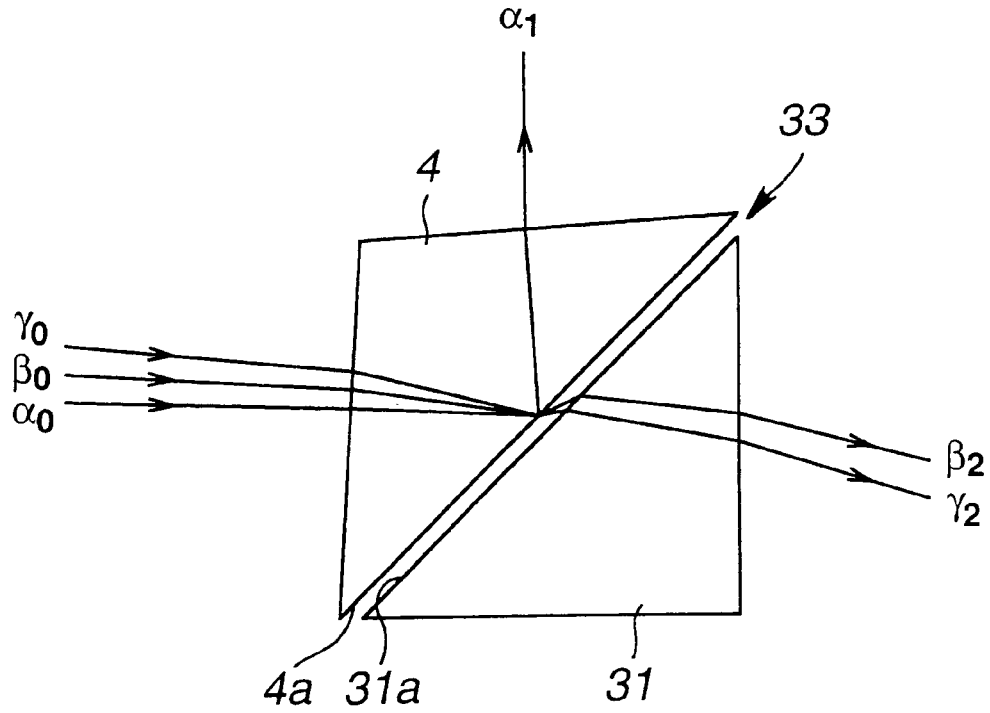
FIG. 11 shows an optical path along which a return light coming, by reflection, from a signal recording surface of an optical disc and having passed through the objective lens, is split at the reflective surface of the critical angle prism and passed through the coupling prism.

To attain a high efficiency of detection by the photosensor 10 of the light having passed through the reflective surface 4a, the coupling prism 31 is provided between the critical angle prism 4 and photosensor 10 in the auxiliary focus servo means 32 as shown in FIG. 11. That is, in the auxiliary focus servo means 15, the light $\beta_0$ or $\gamma_0$ having passed through the reflective surface 4a is incident upon the coupling prism 31, will be refracted as a line $\beta_2$ or $\gamma_2$ in a direction towards the photosensor 10. Thus, the return light having passed through the objective lens 5 can be guided generally perpendicularly to the surface of the photosensor 10.

Also, the auxiliary focus servo means 32 has provided between the critical angle prism 4 and coupling prism 31 an air gap 33 which prevents a change of the critical angle of total internal reflection at the reflective surface 4a of the critical angle prism 4.

For the air gap 33, the spacing between the reflective surface 4a of the critical angle prism 4 and oblique surface 31a of the coupling prism 31 may be on the order of several $\mu$m to hundreds of $\mu$m.

Figure 12:
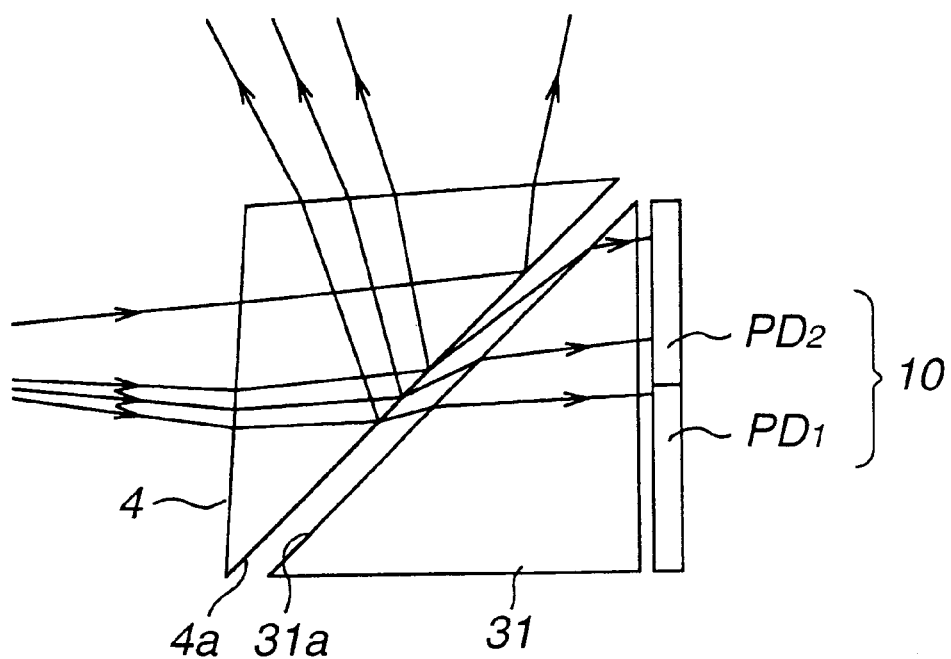
FIG. 12 shows an optical path along which a return light coming from a signal recording surface of an optical disc and having passed through the objective lens, being a divergent light, is split at the reflective surface of the critical angle prism when the gap between the critical angle prism and coupling prism is too large.
Figure 13:
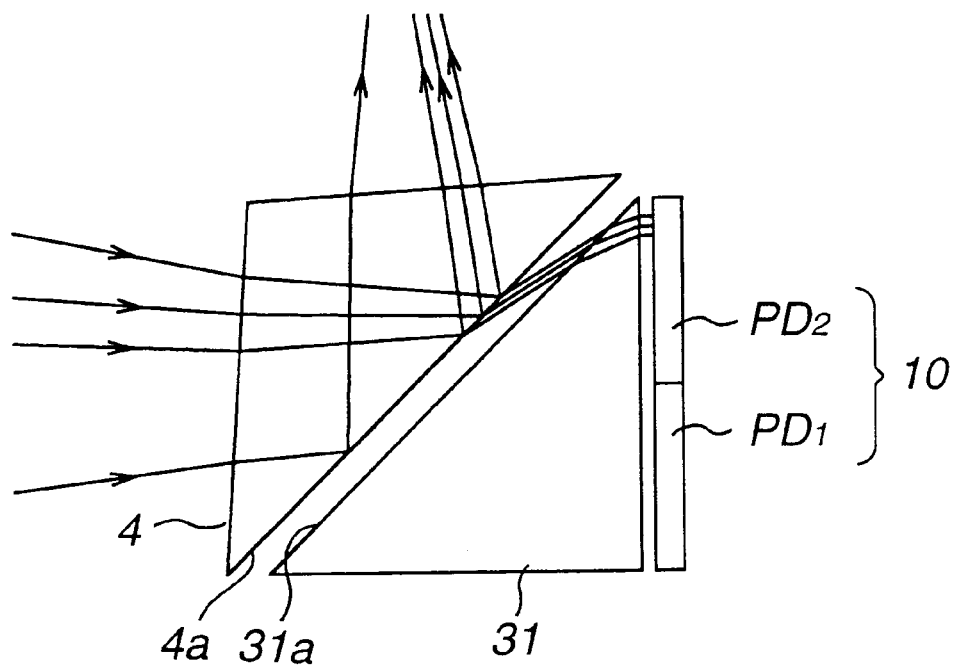
FIG. 13 shows an optical path along which a return light coming from an optical disc and having passed through the objective lens, being a convergent light, is split at the reflective surface of the critical angle prism when the gap between the critical angle prism and coupling prism is too large.

If the air gap 33 is too large, the light having passed through the reflective surface 4a of the critical angle prism 4 will be refracted at a large angle and then incident upon the coupling prism 31 as will be seen from FIGS. 12 and 13. Thus, if the return light having passed through the objective lens 5 is a divergent light, the light having passed through the reflective surface 4a of the critical angle prism 4 is incident upon the photodiodes $PD_1$ and $PD_2$ of the photosensor 10 as shown in FIG. 12 and can hardly be guided to only the photodiode $PD_1$ of the photosensor 10. Also, if the return light having passed through the objective lens 5 is a convergent light, the light having passed through the reflective surface 4a of the critical angle prism 4 is incident upon the end of the photodiode $PD_2$ of the photosensor 10 as shown in FIG. 13 and can hardly be guided to only the photodiode $PD_2$ of the photosensor 10 with a high efficiency.

Figure 14:
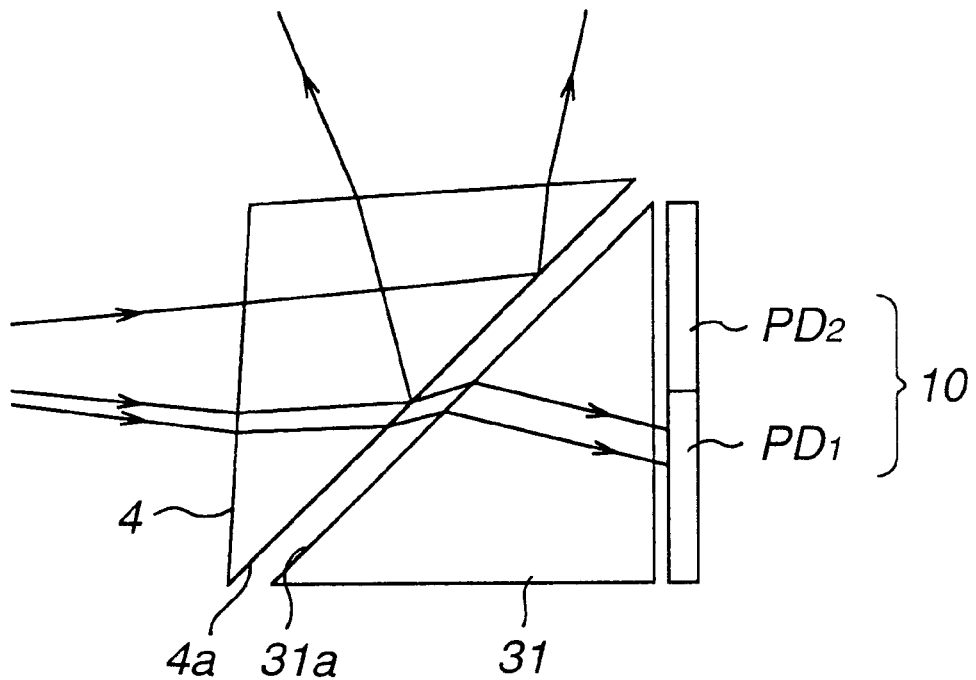
FIG. 14 shows an optical path in the optical head in FIG. 9, along which a return light coming from a signal recording surface of an optical disc and having passed through the objective lens, being a divergent light, is split at the reflective surface of the critical angle prism.
Figure 15:
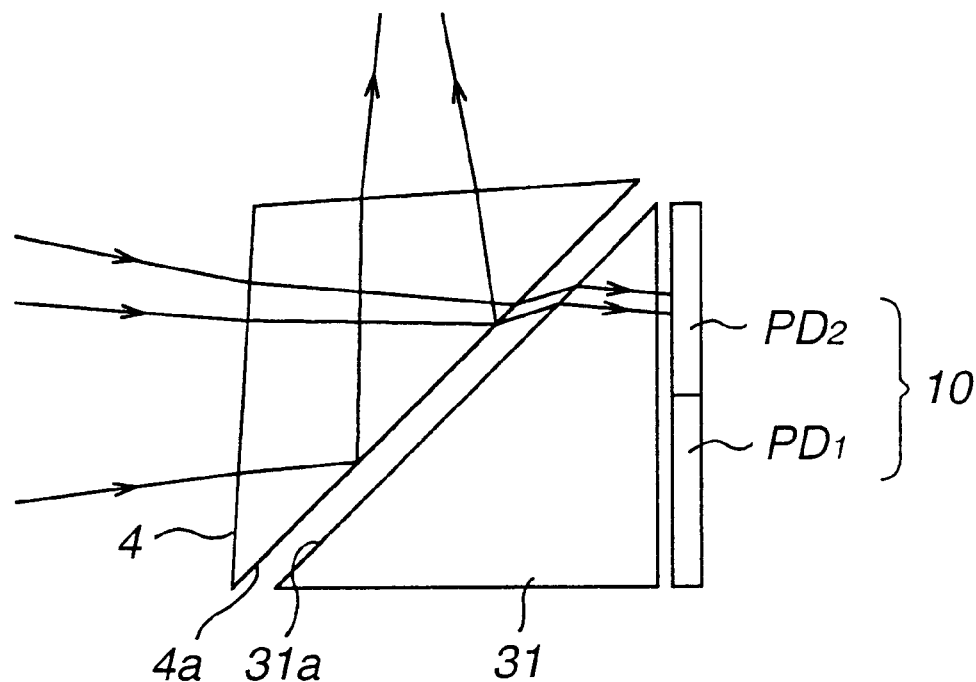
FIG. 15 shows an optical path along which a return light coming from a signal recording surface of an optical disc and having passed through the objective lens, being a convergent light, is split at the reflective surface of the critical angle prism.

By making the air gap 33 smaller, it is possible to guide the light having passed through the reflective surface 4a of the critical angle prism 4 to only the photodiode $PD_1$ of the photosensor 10 if the return light having passed through the objective lens 5 is a convergent light as shown in FIG. 14. Also, it is possible to guide the light having passed through the reflective surface 4a of the critical angle prism 4 to only the photodiode $PD_2$ of the photosensor 10 if the return light having passed through the objective lens 5 is convergent light as shown in FIG. 15.

However, if the air gap 33 is too small, an evanescent light from the reflective surface 4a of the critical angle prism 4 will join the coupling prism 31 with a result that the critical angle at the reflective surface 4a of the critical angle prism 4 cannot be utilized and thus the focus servo by the critical angle method cannot be attained.

Therefore, the spacing between the reflective surface 4a of the critical angle prism 4 and oblique surface 31a of the coupling prism 31 should preferably be on the order of several $\mu$m to hundreds of $\mu$m as mentioned above.

The auxiliary focus servo means 32 thus constructed allows the light having passed through the reflective surfaces 4a of the critical angle prism 4 to efficiently be detected by the photosensor 10 via the coupling prism 31.

Accordingly, the optical head 30 shows the same effect as the optical head 20 according to the first embodiment of the present invention and an improved sensitivity of detection in the auxiliary focus servo means 32.

Figure 16:
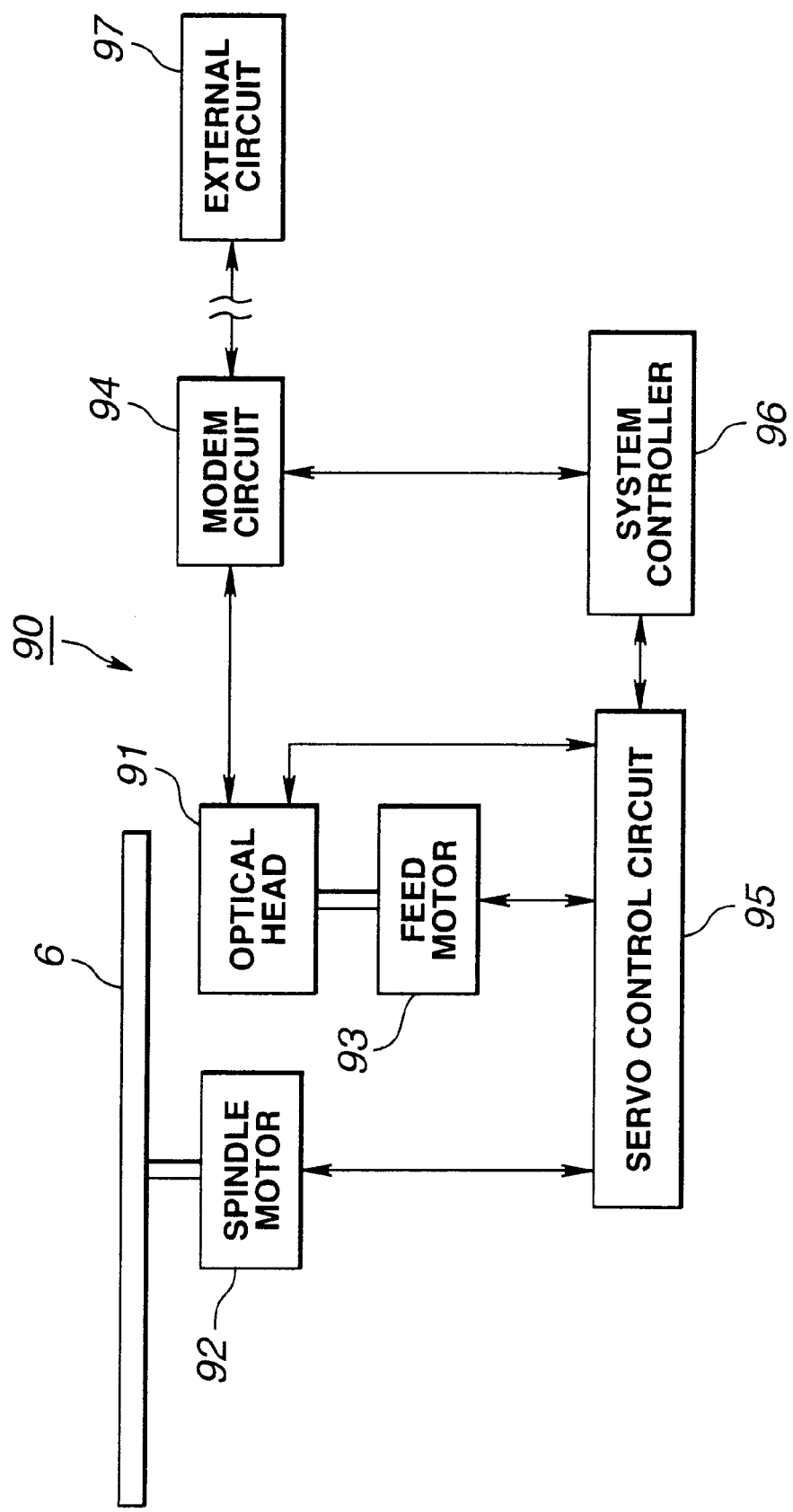
FIG. 16 shows an example of the construction of a recording and/or reproducing apparatus according to the present invention.

Referring now to FIG. 16, there is schematically illustrated an example of the construction of a recording and/or reproducing apparatus according to the present invention. The recording and/or reproducing apparatus is generally indicated with a reference 90 in FIG. 16.

As shown in FIG. 16, the recording and/or reproducing apparatus 90 comprises an optical head 91 according to the present invention, a spindle motor 92 to drive to rotate the optical disc 6, a feed motor 93 to move the optical head 91, an modem circuit 94 to provide a predetermine signal processing, a servo control circuit 95 for servo control of the optical head 91, and a system controller 96 to control the entire system.

The spindle motor 92 is driven and controlled by the servo control circuit 95. It is driven to rotate at a predetermined speed. The optical disc 6 to or from which signal is written or read by the apparatus 90 is chucked on the spindle motor 92 which drives to rotate the optical disc 6 at the predetermined speed.

The optical head 91 emits a laser light to the optical disc 6 being rotated and detects a return light from the latter. The optical head 91 is a one according to the present invention which is the optical head 30, for example.

The optical head 91 is connected to the modem circuit 94. To read information signal from the optical disc 6, the optical head 91 emits a laser light to the optical disc 6 being driven to rotate, detects a read signal from a detected return light from the optical disc 6, and supplies it to the modem circuit 94.

To write information signal to the optical disc 6, a write signal supplied from an external circuit 97 and subjected to a predetermined processing in the modem circuit 94 is supplied to the optical head 91 which will emit a laser light to the optical disc 6 based on the write signal supplied from the modem circuit 94.

The optical head 91 is connected to the servo control circuit 95 as well. To write or read information to or from the optical disc 6, the optical head 91 detects a critical angle focus error signal and astigmatic focus error signal from a return light coming, by reflection, from the optical disc 6 being rotated, as having been described in the foregoing, and supplies them to the servo control circuit 95. Also the optical head 91 will detect a tracking error signal as well from the return light coming, by reflection, from the optical disc 6, and supply it to the servo control circuit 95. In the following description, these signals supplied from the optical head 91 to the servo control circuit 95 will collectively be referred to as "servo signal".

The modem circuit 94 is connected to the system controller 96 and external circuit 97. Under the control of the system controller 96, the modem circuit 94 receives a signal to be written to the optical disc 6 from the external circuit 97, and processes the signal in a predetermined manner. The signal thus modulated by the modem circuit 94 is supplied to the optical head 91.

Also, to read information signal from the optical disc 6, the modem circuit 94 will receive a signal read from the optical disc 6 from the optical head 91 and process it in the predetermined manner, under the control of the system controller 96. The signal demodulated by the modem circuit 94 is delivered from the modem circuit 94 to the external circuit 97.

The feed motor 93 is provided to move the optical head 91 to a predetermined radial position on the optical disc 6 during write or read of information signal to or from the optical disc 6. It is driven based on a control signal supplied from the servo control circuit 95 to which the feed motor 93 is connected.

The servo control circuit 95 is controlled by the system controller 96 to control the feed motor 93 for the optical head 91 to be moved to a predetermined position above the optical disc 6. The servo control circuit 95 is connected also to the spindle motor 92, and controlled by the system controller 96 to control the operation of the spindle motor 92. That is, the servo control circuit 95 controls the spindle motor 92 for the optical disc 6 to be rotated at the predetermined speed during write or read of an information signal to or from the optical disc 6.

Further, the servo control circuit 95 is connected also to the optical head 91. It is supplied with a servo control signal from the optical head 91 as previously described during write or read of the information signal to or from the optical disc 6, and provides focus servo and tracking servo control of the optical head 91 based on the servo control signal. The optical head 91 is servo-controlled for focusing and tracking by moving the objective lens delicately by a biaxial actuator on which the objective lens of the optical head 91 is mounted.

In the recording and/or reproducing apparatus 90 constructed as in the above, focus servo control by the critical angle method can be performed because the optical head 91 adopted is the optical head according to the present invention, and the optical system can be designed to be simple.

In the foregoing, the recording medium has been described concerning an optical disc. However, the present invention can be applied widely to recording media in which the critical angle method is applicable for the focus servo control, and thus it is not limited to the optical disc only.

The optical head according to the present invention is not limited to the embodiments having been described in the foregoing but can be modified in various manners without departing from the scope and spirit of the present invention that will be defined later.

As having been described in the foregoing, according to the present invention, the position of the objective lens can be detected by the auxiliary focus servo means. So, even if a disturbance takes place to displace the objective lens from the in-focus relation to the optical disc, the objective lens can be returned quickly to the in-focus relation to the optical disc and thus prevented from colliding with the latter.

Since the position of the objective lens can be detected by the auxiliary focus servo means, the focus can be pulled in a reduced time during start-up of the system.

Because the auxiliary focus servo means is provided between the optical unit and objective lens, it can be designed to be simple, which will produce to a more compact design of the optical head.

Furthermore, if a dead zone exists for the auxiliary focus servo means, the dead zone can be narrower than the range in which the main focus servo means provides a significant signal output, whereby an accurate focusing can always be attained and focus pull-in can be made in a reduced time irrespectively of the geometric relation of the objective lens to the optical disc.

What is claimed is:

1. An optical head including an optical unit consisting of a light source handy photosensor, and a main focus servo means to allow an objective lens to focus a light beam emitted from the light source, the optical head comprising:

an auxiliary focus servo means provided between the optical unit and objective lens to detect a position of the objective lens;

the objective lens staying outside a range in which the main focus servo means provides a significant signal output, being moved into that range based on a detection signal from the auxiliary focus servo means.

2. The optical head as set forth in claim 1, wherein the auxiliary focus servo means comprises a critical angle prism and photosensor.

3. The optical head as set forth in claim 2, wherein the photosensor is located in the vicinity of the critical angle prism.

4. The optical head as set forth in claim 2, wherein the photosensor detects a light beam whose incident angle at a reflective surface of the critical angle prism is smaller than a critical angle of total internal reflection.

5. The optical head as set forth in claim 1, wherein there is defined in a pull-in range of the auxiliary focus servo means a dead zone in which the detection signal is smaller than predetermined and also there is defined within the dead zone a range in which the main focus servo means provides the significant signal output.

6. The optical head as set forth in claim 5, wherein the dead zone has a narrower range smaller than the range in which the main focus servo means provides the significant signal output.

7. The optical head as set forth in claim 2, wherein a coupling prism is provided in immediate proximity of the critical angle prism.

8. The optical head as set forth in claim 7, wherein the photosensor is disposed in the vicinity of the coupling prism.

9. The optical head as set forth in claim 7, wherein a light beam whose incident angle at a reflective surface of the critical angle-prism is smaller than a inLE critical angle of total internal reflection, is passed through the coupling prism and detected by the photosensor.

10. The optical head as set forth in claim 7, wherein there is provided a gap between the critical angle prism and coupling prism.

11. A recording and/or reproducing apparatus including an optical head to write and read information to and from a recording medium, the optical head comprising:

an optical unit consisting of a light source and photosensor;

a main focus servo means to allow an objective lens to focus a light beam emitted from the light source, and an auxiliary focus servo means provided between the optical unit and objective lens to detect a position of the objective lens;

the objective lens staying outside a range in which the main focus servo means provides a significant signal output, being moved into that range based on a detection signal from the auxiliary focus servo means.

12. The recording and/or reproducing apparatus as set forth in claim 11, wherein the auxiliary focus servo means comprises a critical angle prism and photosensor.

13. The recording and/or reproducing apparatus as set forth in claim 12, wherein the photosensor is located in the vicinity of the critical angle prism.

14. The recording and/or reproducing apparatus as set forth in claim 12, wherein the photosensor detects a light beam whose incident angle at a reflective surface of the critical angle prism is smaller than a critical angle of total internal reflection.

15. The recording and/or reproducing apparatus as set forth in claim 11, wherein there is defined in a pull-in range of the auxiliary focus servo means a dead zone in which the detection signal is smaller than predetermined and also there is defined within the dead zone a range in which the main focus servo means provides the significant signal output.

16. The recording and/or reproducing apparatus as set forth in claim 15, wherein the dead zone has a narrower range smaller than the range in which the main focus servo means provides the significant signal output.

17. The recording and/or reproducing apparatus as set forth in claim 12, wherein a coupling prism is provided in immediate proximity of the critical angle prism.

18. The recording and/or reproducing apparatus as set forth in claim 17, wherein the photosensor is disposed in the vicinity of the coupling prism.

19. The recording and/or reproducing apparatus as set forth in claim 17, wherein a light beam whose incident angle at a reflective surface of the critical angle prism is smaller than a critical angle of total internal reflection, is passed through the coupling prism and detected by the photosensor.

20. The recording and/or reproducing apparatus as set forth in claim 17, wherein there is provided a gap between the critical angle prism and coupling prism.

21. An optical disc drive including an optical unit consisting of a light source and photosensor, and a focus servo means to allow an objective lens to focus a light beam emitted from the light source towards an optical disc, the focus servo means comprising:

a first focus servo means for detecting a position of the objective lens staying in a first range in which a light beam irradiated towards the optical disc is nearly just focused on the optical disc; and a second focus servo means for detecting a position of the objective lens moved into a second range outside the first range and in which the first focus servo means provides a significant signal output.

22. The optical disc drive as set forth in claim 21, wherein when the objective lens stays outside the first range in which the first focus servo means provides the significant signal output, the focus servo means allows the objective lens to move into the first range based on the detection signal from the second focus servo means.

23. The optical disc drive as set forth in claim 21, wherein the first focus servo means provides a focus servo based on a signal detected by the photosensor.

24. The optical disc drive as set forth in claim 21, further comprising a second photo detector disposed between the optical unit and objective lens;

the second focus servo means providing a focus servo based on a signal detected by the second photosensor.

25. The optical disc drive as set forth in claim 21, wherein there is defined in a pull-in range of the second focus servo means a dead zone in which the detection signal is smaller than predetermined and the first range is defined within the dead zone a range in which the first focus servo means provides the significant signal output.

26. The optical disc drive as set forth in claim 25, wherein the dead zone has a narrower range smaller than the range in which the first focus servo means provides the significant signal output.

27. The optical disc drive as set forth in claim 21, wherein the second focus servo means comprises a critical angle prism and a second photodetector.

28. The optical disc drive as set forth in claim 27, wherein the second photosensor is disposed in the vicinity of the critical angle prism.

29. The optical disc drive as set forth in claim 27, wherein a light beam whose incident angle at a reflective surface of the critical angle prism is smaller than a critical angle of total internal reflection, is detected by the second photosensor.

* * * * *

UNITED STATES PATENT AND TRADEMARK OFFICE
CERTIFICATE OF CORRECTION

PATENT NO.    : 6,236,031 B1
DATED         : May 22, 2001
INVENTOR(S)   : Mitsunori Ueda It is certified that error appears in the above-identified patent and that said Letters Patent is hereby corrected as shown below:

Column 14, claim 1,
Line 60, replace "handy" with -- and --.

Column 15, claim 9,
Line 29, delete the hyphen between "angle" and "prism".
Line 29, delete "inLE".

Signed and Sealed this

Nineteenth Day of March, 2002

Attest:

JAMES E. ROGAN
*Director of the United States Patent and Trademark Office*

*Attesting Officer*